United States Patent
Salter et al.

(10) Patent No.: US 9,235,051 B2
(45) Date of Patent: Jan. 12, 2016

(54) MULTI-SPACE CONNECTED VIRTUAL DATA OBJECTS

(71) Applicant: Microsoft Technology Licensing, LLC, Redmond, WA (US)

(72) Inventors: Tom G. Salter, Seattle, WA (US); Ben J. Sugden, Woodinville, WA (US); Daniel Deptford, Redmond, WA (US); Robert L. Crocco, Jr., Seattle, WA (US); Brian E. Keane, Bellevue, WA (US); Laura K. Massey, Redmond, WA (US); Alex Aben-Athar Kipman, Redmond, WA (US); Peter Tobias Kinnebrew, Seattle, WA (US); Nicholas Ferianc Kamuda, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 100 days.

(21) Appl. No.: 13/921,102

(22) Filed: Jun. 18, 2013

(65) Prior Publication Data

US 2014/0368533 A1 Dec. 18, 2014

(51) Int. Cl.
  *G09G 5/00* (2006.01)
  *G02B 27/01* (2006.01)
  *G06F 3/01* (2006.01)
  *G06F 3/0481* (2013.01)

(52) U.S. Cl.
  CPC .............. *G02B 27/017* (2013.01); *G06F 3/017* (2013.01); *G06F 3/04815* (2013.01)

(58) Field of Classification Search
  None
  See application file for complete search history.

(56) References Cited

U.S. PATENT DOCUMENTS

| | | |
|---|---|---|
| 2002/0044152 A1 | 4/2002 | Abbott et al. |
| 2007/0173956 A1 | 7/2007 | Koch et al. |
| 2007/0253600 A1* | 11/2007 | Furukawa et al. ............. 382/112 |
| 2008/0266323 A1* | 10/2008 | Biocca et al. ................ 345/633 |
| 2011/0050727 A1 | 3/2011 | Mukawa |
| 2011/0059759 A1 | 3/2011 | Ban |
| 2011/0138286 A1 | 6/2011 | Kaptelinin et al. |
| 2011/0213664 A1* | 9/2011 | Osterhout et al. ......... 705/14.58 |
| 2011/0307520 A1 | 12/2011 | Trofin et al. |
| 2012/0001938 A1* | 1/2012 | Sandberg ....................... 345/633 |
| 2012/0092454 A1 | 4/2012 | Tourapis et al. |
| 2012/0113092 A1 | 5/2012 | Bar-Zeev et al. |
| 2012/0200593 A1 | 8/2012 | Todd et al. |
| 2013/0038510 A1 | 2/2013 | Brin et al. |
| 2013/0044042 A1 | 2/2013 | Olsson et al. |

FOREIGN PATENT DOCUMENTS

DE  102009037835 A1  2/2011
WO  2012/056438 A2  5/2012

OTHER PUBLICATIONS

International Search Report & Written Opinion dated Oct. 16, 2014, in Int'l Patent Appl. No. PCT/US2014/042652 filed Jun. 17, 2014.

* cited by examiner

*Primary Examiner* — Nicholas Lee
(74) *Attorney, Agent, or Firm* — Dan Choi; Judy Yee; Micky Minhas

(57) ABSTRACT

A see-through head mounted display apparatus includes a display and a processor. The processor determines geo-located positions of points of interest within a field of view and generates markers indicating information regarding an associated real world object is available to the user. Markers are rendered in the display relative to the geo-located position and the field of view of the user. When a user selects a marker though a user gesture, the device displays a near-field virtual object having a visual tether to the marker simultaneously with the marker. The user may interact with the marker to view, add or delete information associated with the point of interest.

20 Claims, 17 Drawing Sheets

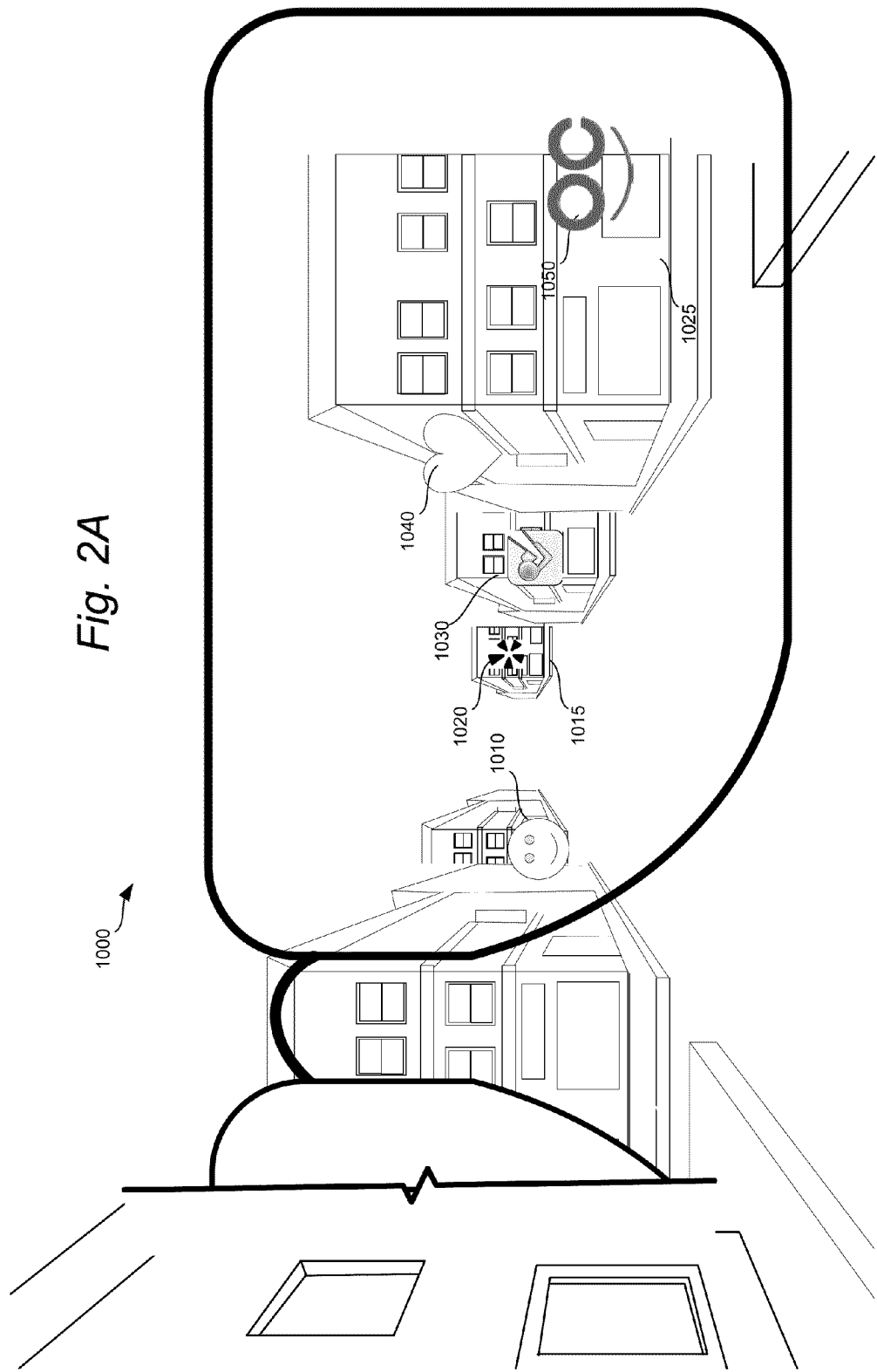

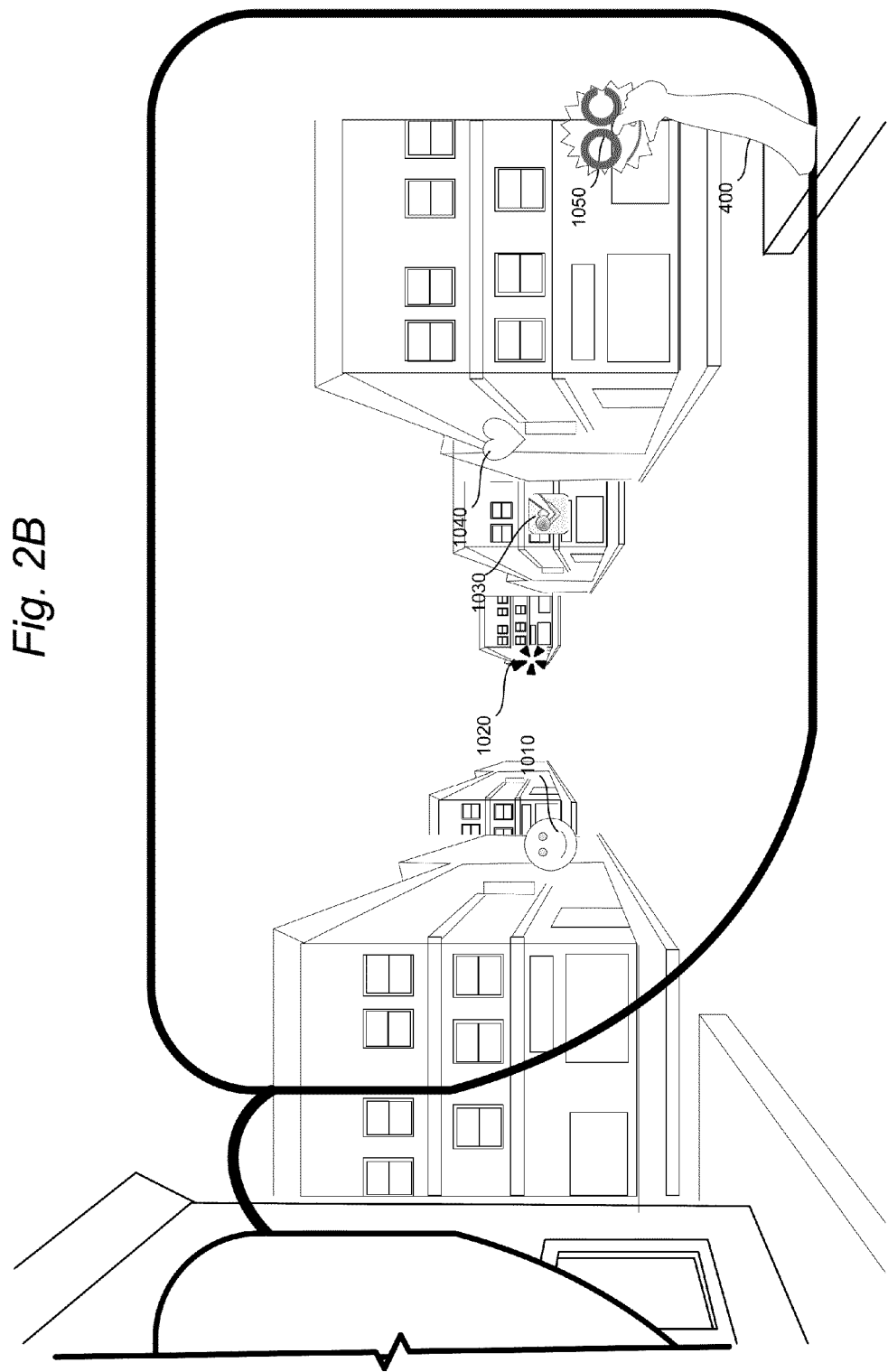

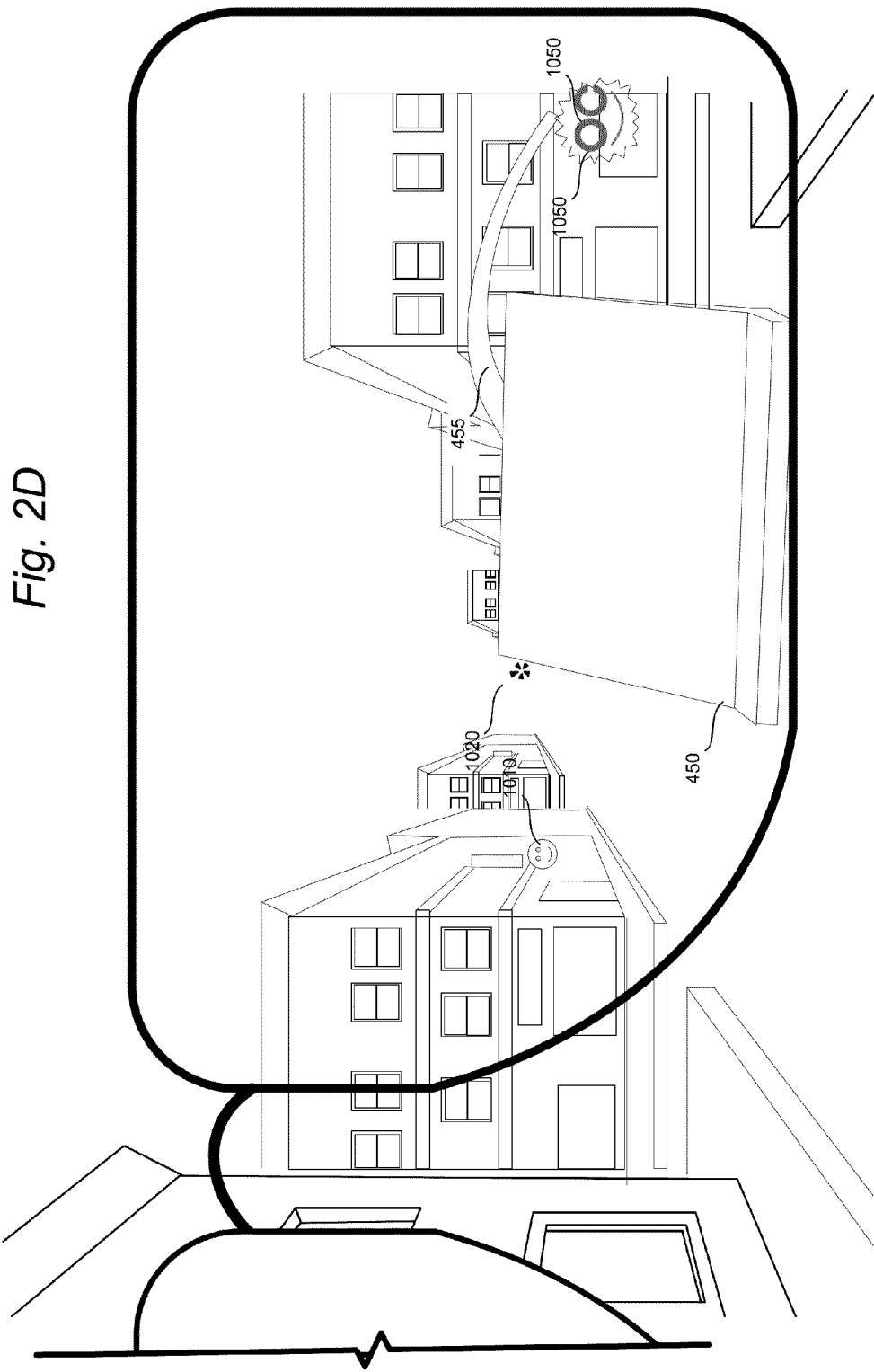

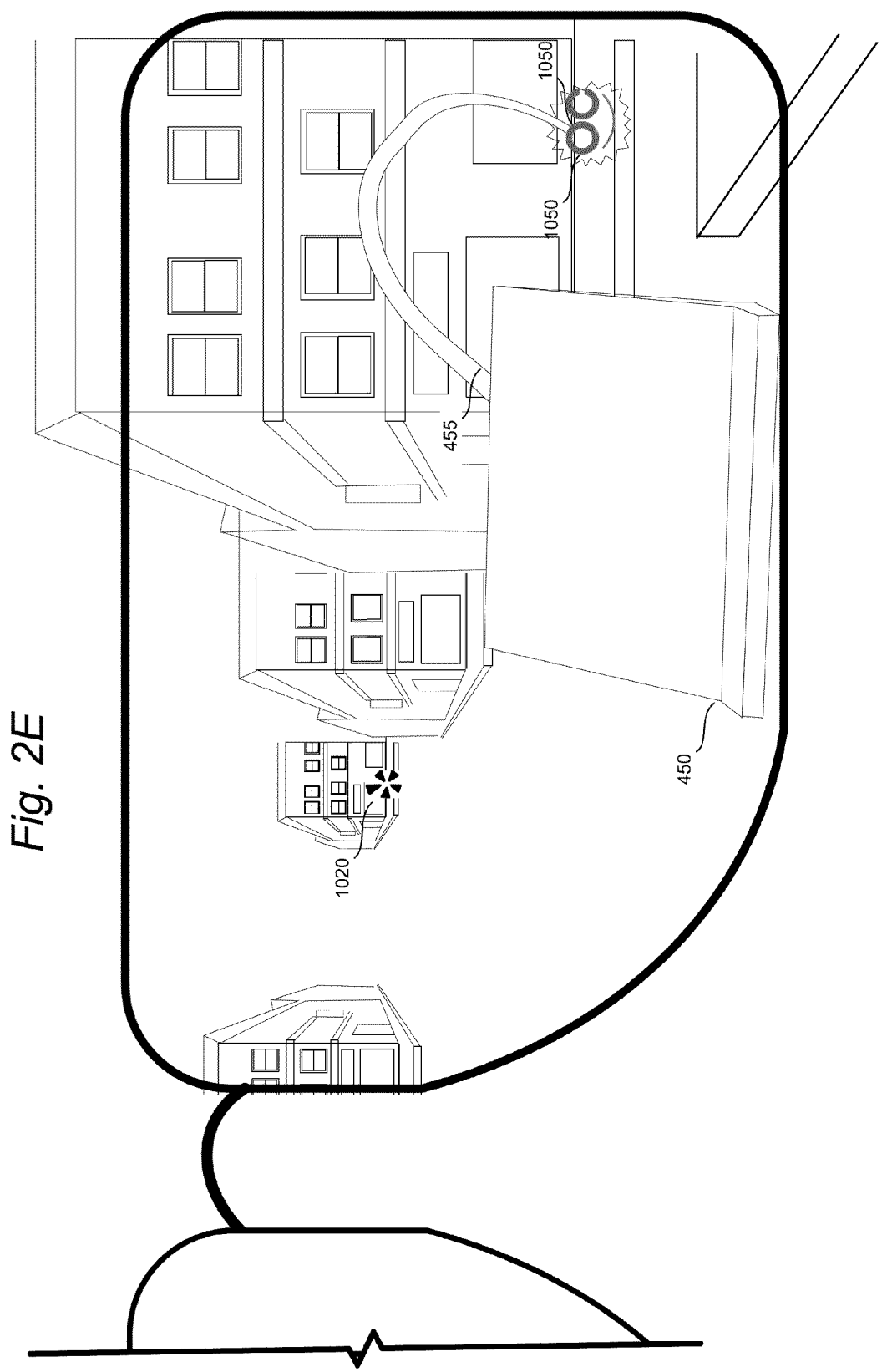

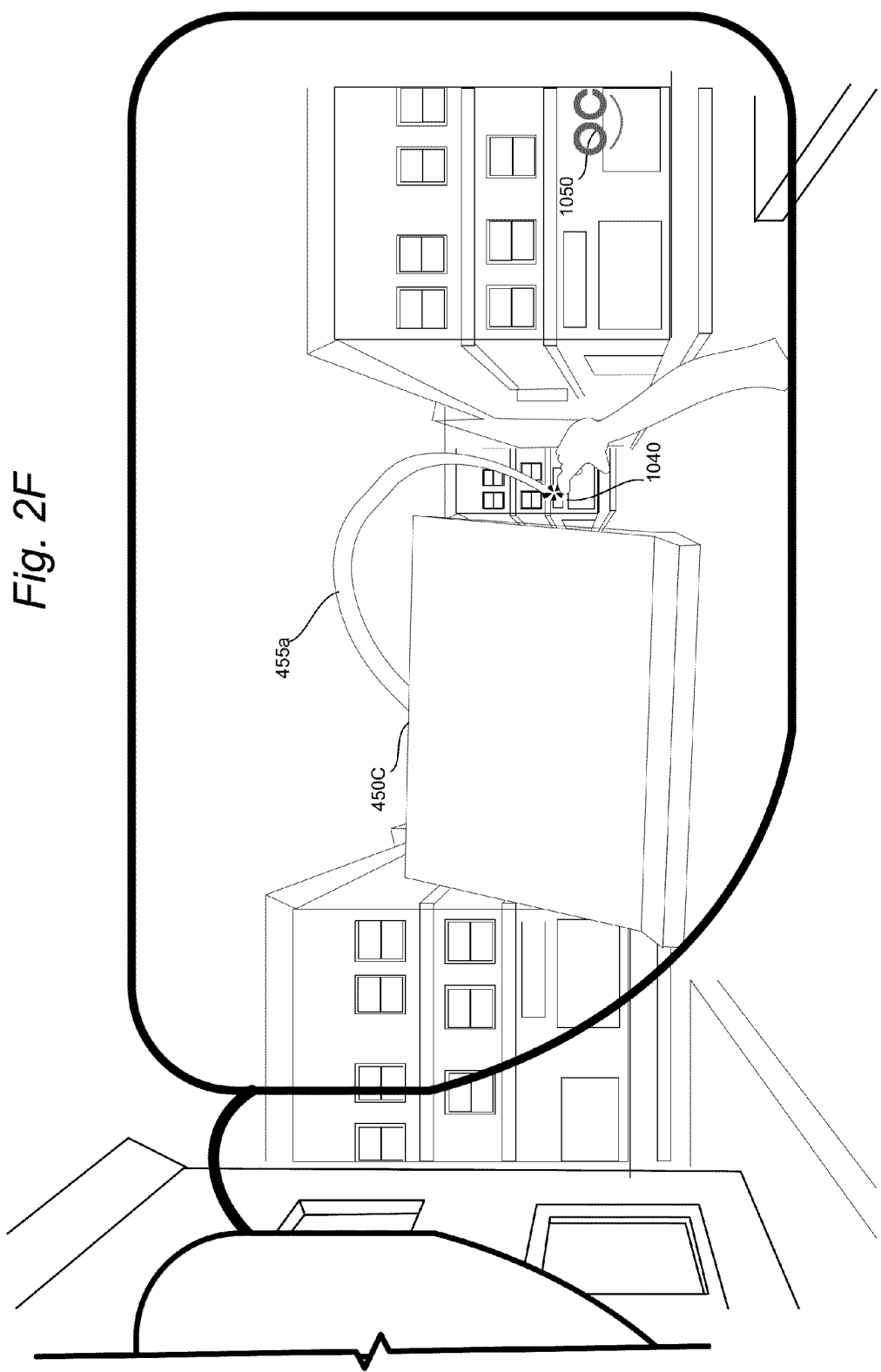

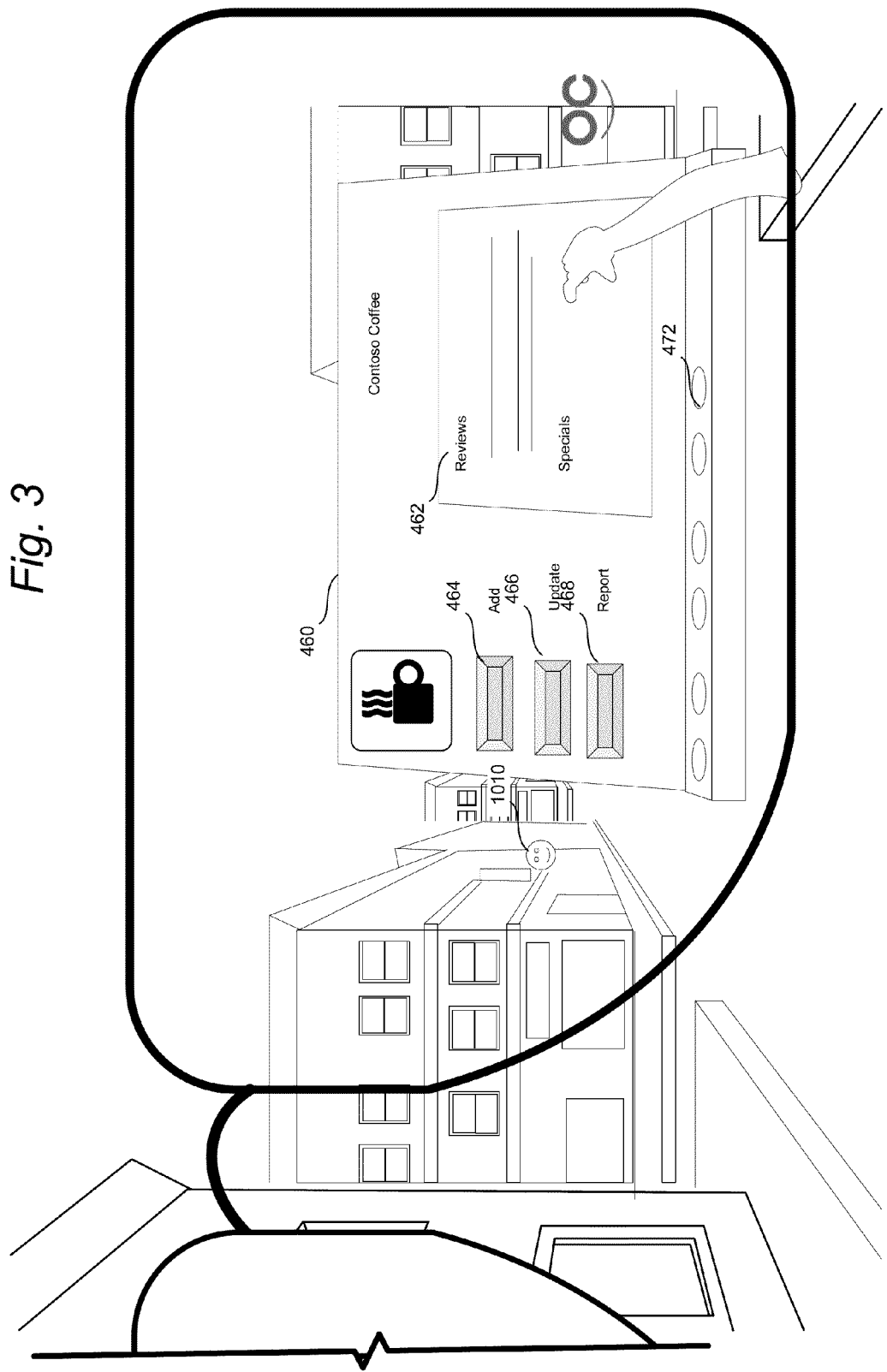

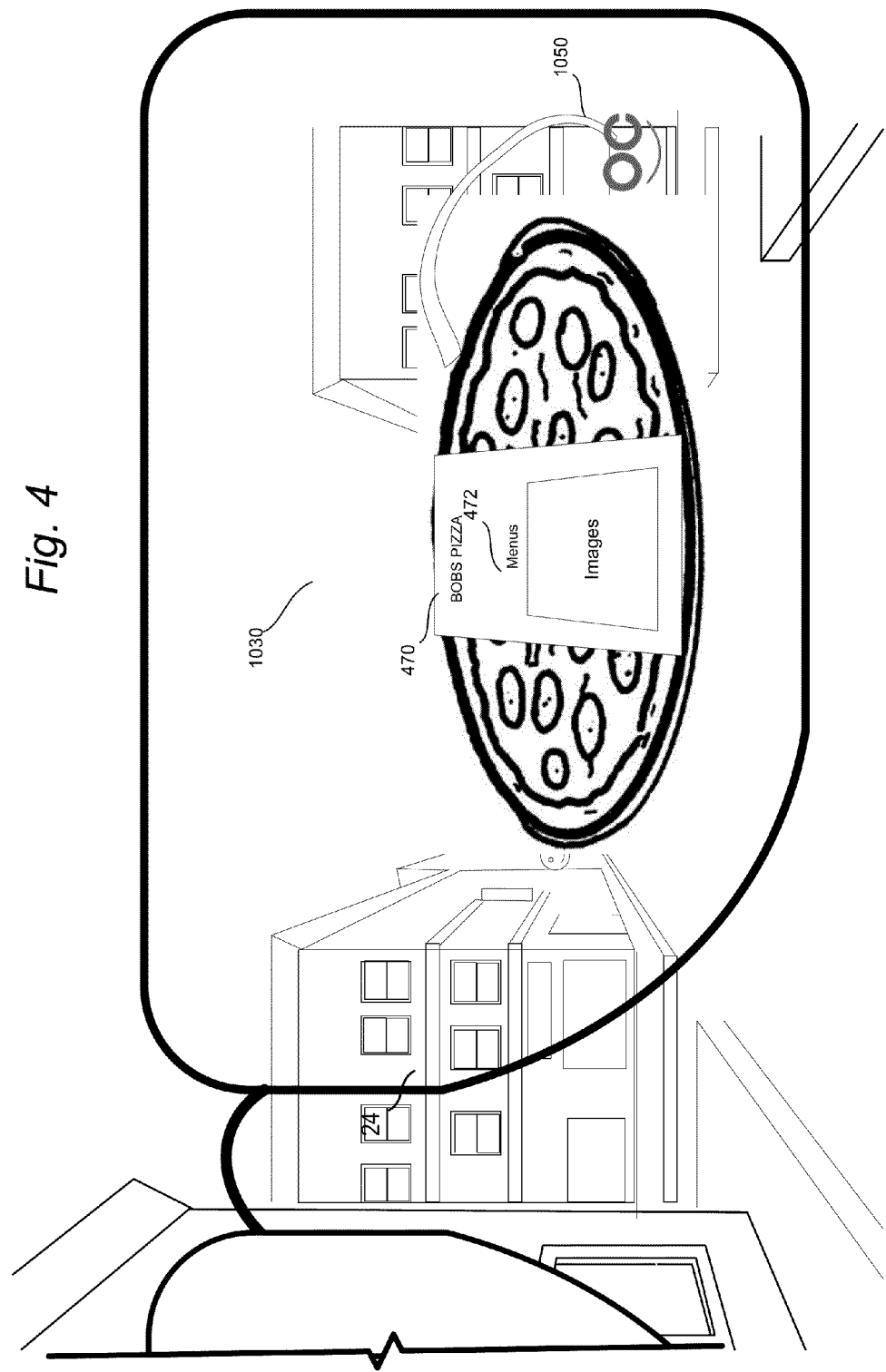

MULTI-SPACE CONNECTED VIRTUAL DATA OBJECTS

BACKGROUND

Mixed reality is a technology that allows virtual imagery to be mixed with a real world physical environment. A see-through, head mounted display (HMD) device may be worn by a user to view the mixed imagery of real objects and virtual objects displayed in the user's field of view. A user may further interact with virtual objects, for example by performing hand, head or voice gestures to move the objects, alter their appearance or simply view them.

HMDs may be capable of providing a large amount of information on object in a real world environment to a wearer. In a real world environment, rendering all the available information associated with real world objects in an HMD results in a crowded display, making it difficult to understand one's physical environment.

SUMMARY

Technology for the display of information on points of interest in a see-through head mounted display device is provided. For any scene which a wearer of an HMD has a field of view, a number of markers of physical points of interest in the field of view are displayed to the user. Each marker represents an indication that additional information regarding the point of interest is available. The wearer may select markers in the scene, and be provided with additional information in the form of a near field virtual object. The near field virtual object is displayed with a visual indication or tether to the marker. When a user physically moves, the display shows the near-field object and markers relative to the user movement and positions of the markers.

In one aspect, a see-through head mounted display device includes a display and a processor. The processor determines geo-located positions of points of interest within a field of view of a user and generates markers indicating information regarding an associated real world object is available to the user. Markers are rendered in the display relative to the geo-located position and the field of view of the user. When a user selects a marker though a user gesture, the device displays a near-field virtual object having a visual tether to the marker simultaneously with the marker. The user may interact with the marker to view, add or delete the information.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 2A through 2F represent the perspective of the user in FIG. 1 viewing the real world environment through a see-through and head mounted display.

FIG. 3 illustrates a near field virtual object in accordance with the present technology.

FIG. 4 illustrates an alternative near virtual object.

DETAILED DESCRIPTION

Figure 1:
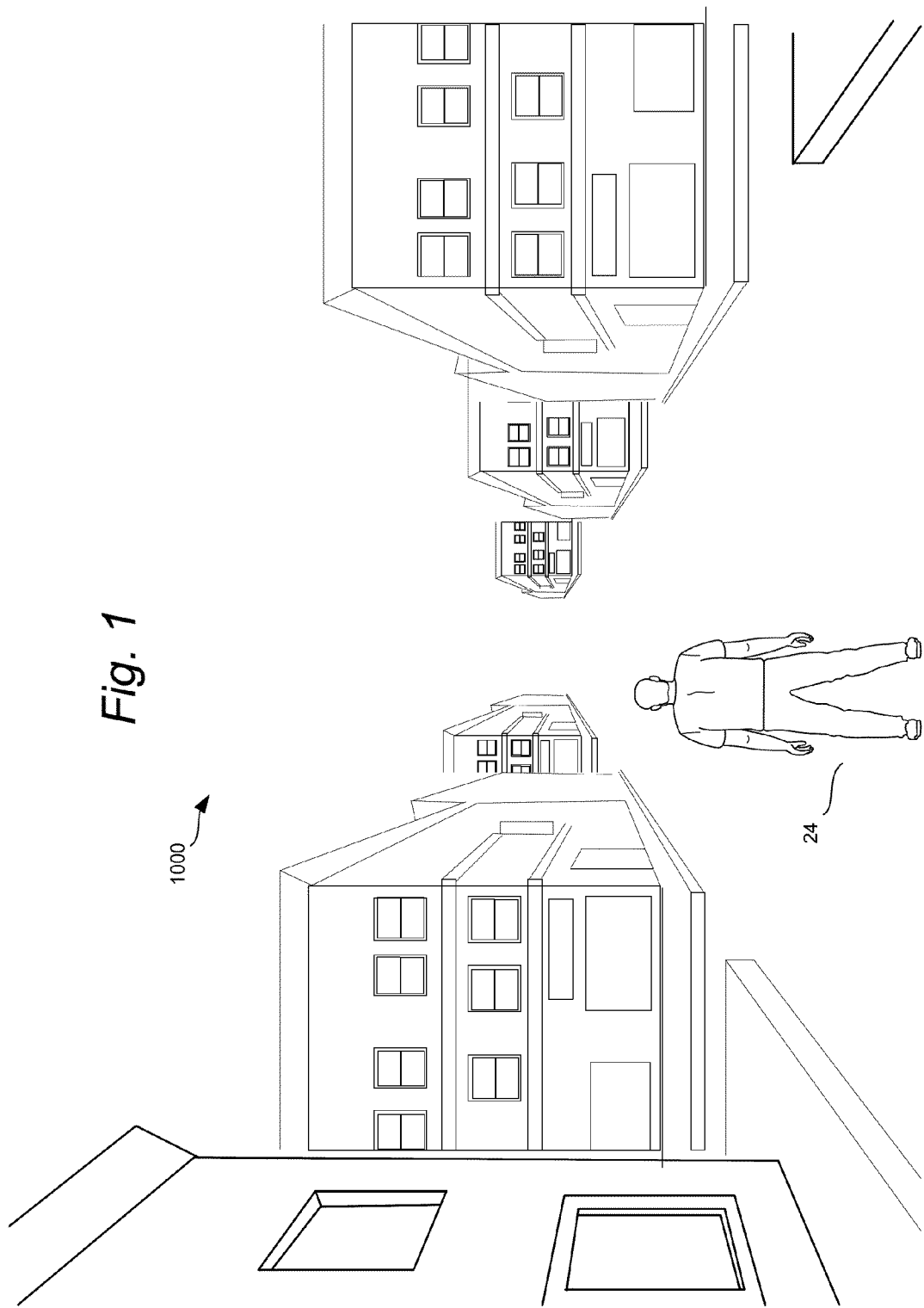
FIG. 1 represents a perspective view a user relative to a real-world environment.

Technology is presented which allows for the display of information on points of interest in a see-through head mounted display device. The technology allows a wearer of a device to select and view a multitude of different types of information for an environment in an uncluttered manner. For any scene which a wearer of an HMD has a field of view, a number of markers for points of interest in the field of view are displayed to the user. Each marker represents an indication that additional information regarding the point of interest is available. The wearer of may select markers in the scene, and be provided with additional information in the form of a near field virtual object. The near field virtual object is displayed with a visual indication or tether to the original location of the marker. The technology detects user movement and calibrates the display to show the near-field object and markers relative to the user movement and positions of the markers. The wearer can close a near-field object and select a different object. The markers may be references in relation to a geographic coordinate system in real world space, and the information provided by third party service providers.

The technology makes use of a see-through head mounted display device. A see-through head mounted display device may include a display element. The display element is to a degree transparent so that a user can look through the display element at real world objects within the user's field of view (FOV). The display element also provides the ability to project virtual images into the FOV of the user such that the virtual images may also appear alongside the real world objects. The system automatically tracks where the user is looking so that the system can determine where to insert the virtual image in the FOV of the user. Once the system knows where to project the virtual image, the image is projected using the display element.

In one alternative, one or more of the processing units may cooperate to build a model of the environment including the positions of all users, real world objects and virtual three-dimensional objects in the room or other environment. The positions may be reference by a local Cartesian coordinate system using, for example, a location or the wearer as a point of reference, or a global coordinate system. The positions of each head mounted display device worn by the users in the environment may be calibrated to the model of the environment and to each other. This allows the system to determine each user's line of sight and FOV of the environment. Thus, a virtual object may be displayed to each user, but the display of the virtual image from each user's perspective may be relative, adjusting the virtual image for parallax and any occlusions from or by other objects in the environment. The model of the environment, referred to herein as a scene map, as well as all tracking of the user's FOV and objects in the environment may be generated by the mobile processing unit.

In one embodiment, as a user moves around within a mixed reality environment, virtual objects may be repositioned relative to the positions of each user or may remain static relative to a fixed geographic coordinate location.

FIG. 1 illustrates an environment 1000 with a viewer or user 24 standing in the environment. The user 24 has a particular's perspective in relation to the viewer's FOV. A number of buildings are shown in the environment, with each building potentially housing a point of interest for the user. Points of interest need not be housed within a building, but may comprise any location for which additional information may be provided in accordance with discussion herein. For example, a point of interest may be a location on at which a significant event occurred.

Any number of different types of social media services may provide information on the points of interest within the environment 1000. Examples of social media services which provide such types of information include Yelp®, Foursquare® and SoCL. Without a see-through head mounted display, user 24 would be gather a view information provided from such social media services on a computing device. Such devices have the ability determine points of interest for the user from the user's location in the environment 1000 which are within a given range from the user 24. Each service provides additional information on the point of interest within the environment, and the user accesses such information by selecting one or more links provided by the social media service.

FIG. 2A represents the view of the environment 1000 as viewed through one lens of a two-lens see-through head mounted display device. It will be understood that the view shown in FIG. 2A is repeated in the second lens, but for purposes of illustration, only one lens view is shown. In FIG. 2A, points of interest for which additional information is available are identified to the user by markers 1010, 1020, 1030, 1040, 1050. Each marker bears a symbolic relationship (a visual relationship) to the source of the information provided the information. For example, a Yelp logo 1020 indicates a point of interest in a real world location in building 1015, and that in information provided on this point of interest is available from the social media service Yelp. Marker 1030 illustrates a point of interest which is linked to information from the social media service Foursquare. Marker 1050 illustrates the source of the information associated with a point of interest identified by the marker as being that from SoCl social media service.

Markers need not be from third party sources, but may represent user-generated information. Marker 1010 may be a user generated point of interest, previously marked by the user or marked by a user's and transmitted to the user or user's stored information. Marker 1040 may illustrate a favorite location of the user, previously defined by the user using the present technology.

Each of the markers is rendered so that they appear physically near to the point of interest with which they are associated. The appearance is generated by the see-through head mounted display device to provide the user with a perspective that the marker is physically close to the point of interest.

As illustrated in FIG. 2A, markers may have an appearance associated with their distance from the wearer. In FIG. 2A, some points of interest which are physically closer to the user (see FIG. 10), such as marker 1050, appear larger and relative to the location with which they are associated, then markers which are physically more distant, such as marker 1020. As such, the relationship of the marker to the point of interest in the user may be understood by the user based on the relative distances to both the user and the point of interest.

In alternative embodiments, markers may be provided with an alternative appearance (in terms of size, highlighting or other means) as a result of other factors. One such factor may be the provision of highlighting by the operator or owner of a point of interest for which a marker is associated.

FIG. 2B illustrates a user interaction with one of the markers, in this case marker 1050. When wearing a see-through head mounted display device 2, a user will be able to see the user's own appendages, such as the user's appendage 400, in the space around the viewer's body. As the user reaches out with appendage 400 user can physically interact with marker 1050 by reaching toward the physical space at which the marker appears to exist to the user. A detection of the interaction occurs by the display device 2 by for example detection of the movement of the appendage 400 into the space occupied by a line between the user's gaze and the marker 1050. Upon detecting a gesture by the user to interact with the marker 1050, the display device 2 may indicate to the user through a highlight or other feedback that the user has successfully interacted with the marker 1050.

Figure 2C:
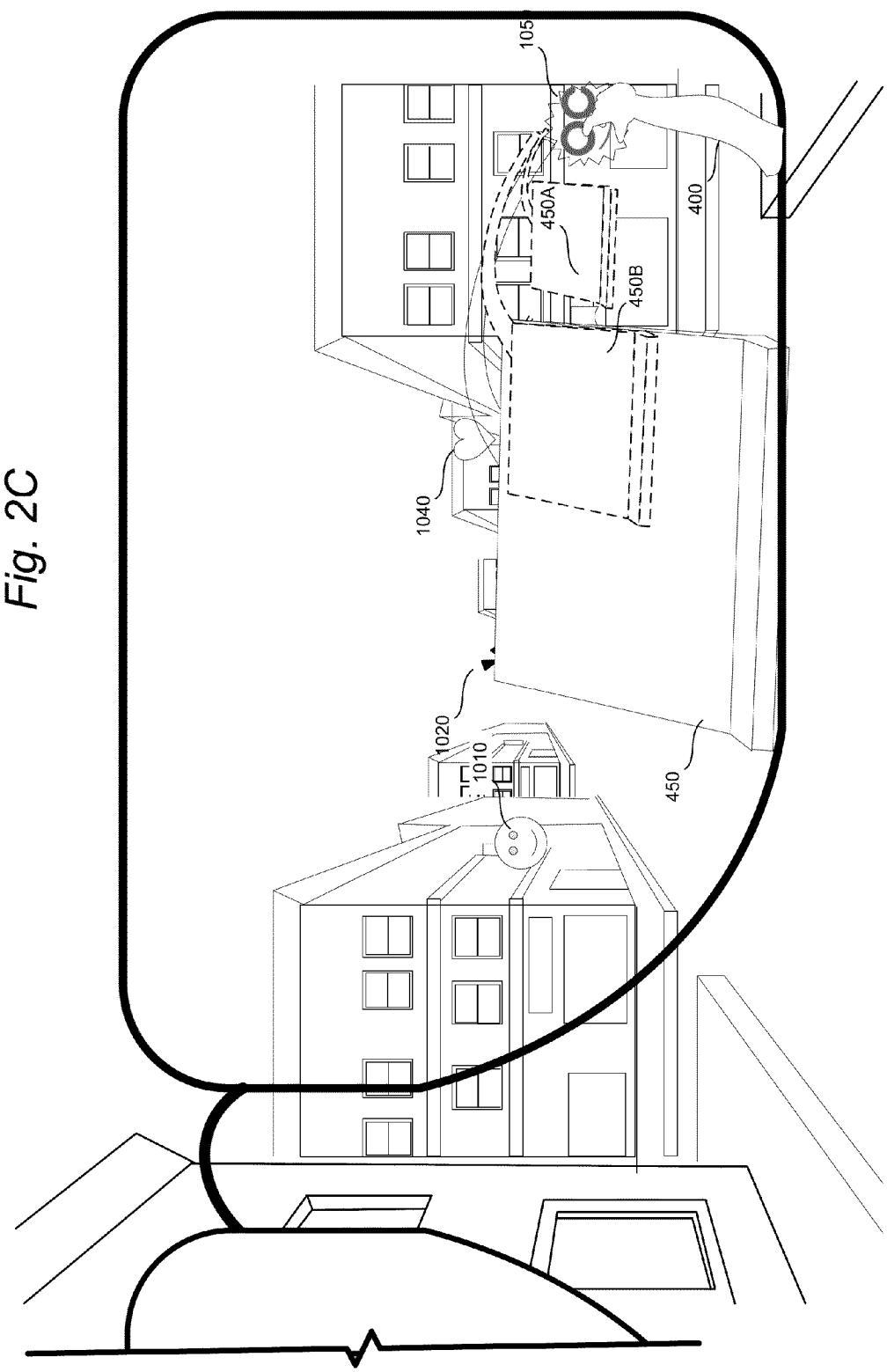

FIG. 2C illustrates the result of the interaction illustrated in FIG. 2B. As the user engages marker 1050, a near field virtual object 450 will be displayed. FIG. 2C illustrates that the near field virtual object 450 can be displayed as an animated projection from marker 1050. The projection will have several intermediate stages 450A and 450B, but it should be understood that the animation may comprise a smooth transition appearing to the user as if the object 450 grows and extends from the marker 1050 to the position shown in FIGS. 2C and 2D.

FIG. 2D illustrates the fully extended near field virtual object 450. A visual indicator 455, in this case a tether, links the projected near field virtual object 450 to the originating marker 1050. The visual indicator 455 allows a user to maintain a reference between the information which can be displayed on near field virtual object 450 and the source of the information of marker 1050. In this manner the object 450 appears in multiple spaces—the space of the original marker 1050 and the near field object 450. In this context, the term "near field" virtual object indicates that the object appears in an expanded view to the user, fully or partially obscuring the user's view of the environment 1000 when wearing a see-through head mounted display 2. In one embodiment, the near field object occupies a majority of the user's field of view.

While viewing near field object 450, it is possible that the wearer may change positions relative to the environment. FIG. 2E illustrates that as the user's perspective changes relative to the marker, the user's view of the near field virtual change as well. The manner in which the user's perspective of the near field object 450 will change may depend on whether the near field object 450 is world-locked or user-locked. In alternative embodiments, the near field object may be linked to the global coordinate system, or may be linked to a local coordinate system referenced to the wearer.

FIG. 2E, the user has moved closer to the point of interest associated with marker 1050. This may occur, for example as a user approaches a point of interest. As the user approaches the point of interest marked at 1050, the near field object may travel with the user and the tether be adjusted so that the link can guide the user to the point of interest associated with the marker 1050. This represents a view associated with a locally-locked object 450. If the object 450 is world-locked, the object 450 may appear not to move in space as the user moves closer or around the object 450 within the environment 1000.

When a wearer is finished interacting with a near field object, the user may close the object by means of a gesture. In one embodiment, the object may appear to shrink back to the associated marker in a reverse of the animation represented and discussed above with respect to FIG. 2B.

As illustrated in FIG. 2F, any of the markers within the field of view of the wearer of the see-through head mounted display device may generate a near field virtual object by interaction from the user. In FIG. 2F, the user has selected marker 1040 in a new near field object 450C is generated. A tether visual indication 455*a* links marker 1040 to object 450C.

Each near field object may be populated with information from one or more sources. The sources which may be provided include the user's own information retrieved from a user database, information from the user's social media friends, sponsored information from owners of points of interest (sponsorship of a marker), or information from other, third party social media sources including users who are not the wearer's social media friends.

FIG. 3 illustrates an exemplary near field virtual object 460 for a point of interest "Contoso Coffee." In the illustration in FIG. 3, the visual tether is not shown for purposes of clarity. However, the visual tether may remain present and viewable by the users. As illustrated in FIG. 3, the near field virtual object 460 may include a text/image/audio section 462, as well as apparent input controls 464 466 and 468 and an apparent controls 472. Virtual interaction by the user with the apparent controls may allow the user to add additional information to the stored information which populates the virtual object 460. Any type of information which is available via a social media website, sponsored information, or information stored in a user's own database, can be used to populate virtual object 460.

While virtual object 460 shown in FIG. 3 appears as a terminal, any type of virtual object may emanate from any one or more of the markers. In addition, different virtual objects may emanate from each marker. This allows customization of the near field object based on the type of information presented, and allows points of interest to define their own types of virtual objects 460 to be displayed to wearers. Types of input which may be retrieved from the see-through head mounted display device include any type of information which may be determined by the device 2 relative to user movements, user utterances, or user motion. The device 2 detects such motion and data to add information through the represented interface of the virtual object 460. While the user perceives an interaction with the virtual object 460, actual data for the input is determined by the see-through head mounted display device.

FIG. 4 illustrates another example of a near field virtual object 470. Near field virtual object 470 takes on a different shape, may provide, for example, a branded menu for a particular point of interest. In the example shown in FIG. 4, virtual object 470 is illustrated as a pizza, associated with "Bob's Pizza" restaurant. A virtual tether remains to the original marker 1050 from which the virtual object 470 has originated.

Figure 5:
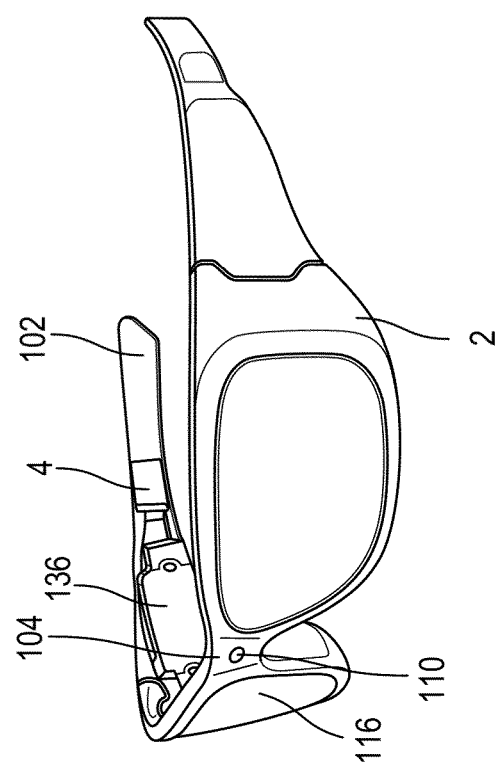
FIG. 5 is a perspective view of one embodiment of a head mounted display unit.
Figure 6:
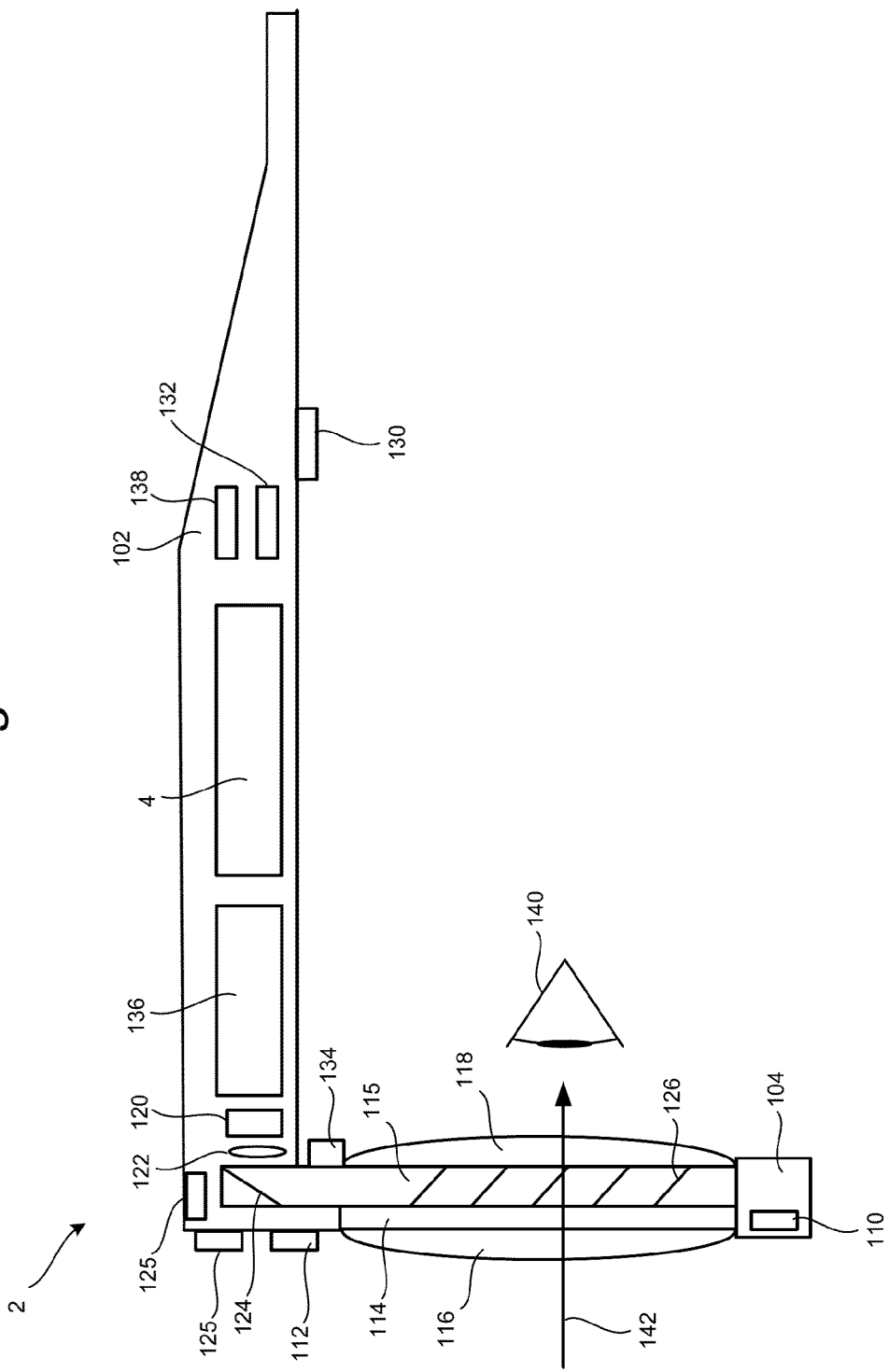
FIG. 6 is a side view of a portion of one embodiment of a head mounted display unit.

FIGS. 5 and 6 show perspective and side views of the head mounted display device 2. FIG. 6 shows the right side of head mounted display device 2, including a portion of the device having temple 102 and nose bridge 104. Built into nose bridge 104 is a microphone 110 for recording sounds and transmitting that audio data to processing unit 4, as described below. At the front of head mounted display device 2 is room-facing video camera 112 that can capture video and still images. Those images are transmitted to processing unit 4, as described below.

As seen in FIGS. 5 and 6, a head mounted display device 2 may include an integrated processing unit 4. In other embodiments, the processing unit 4 may be separate from the head mounted display device 2, and may communicate with the head mounted display device 2 via wired or wireless communication.

Head mounted display device 2, which in one embodiment is in the shape of glasses, is worn on the head of a user so that the user can see-through a display and thereby have an actual direct view of the space in front of the user. The use of the term "actual direct view" refers to the ability to see the real world objects directly with the human eye, rather than seeing created image representations of the objects. For example, looking through glass at a room allows a user to have an actual direct view of the room, while viewing a video of a room on a television is not an actual direct view of the room. More details of the head mounted display device 2 are provided below.

The processing unit 4 may include much of the computing power used to operate head mounted display device 2. In embodiments, the processing unit 4 communicates wirelessly (e.g., WiFi, Bluetooth, infra-red, or other wireless communication means) to one or more central service 900.

A portion of the frame of head mounted display device 2 will surround a display that includes one or more lenses. In order to show the components of head mounted display device 2, a portion of the frame surrounding the display is not depicted. The display includes a light-guide optical element 115, opacity filter 114, see-through lens 116 and see-through lens 118. In one embodiment, opacity filter 114 is behind and aligned with see-through lens 116, light-guide optical element 115 is behind and aligned with opacity filter 114, and see-through lens 118 is behind and aligned with light-guide optical element 115. See-through lenses 116 and 118 are standard lenses used in eye glasses and can be made to any prescription (including no prescription). Light-guide optical element 115 channels artificial light to the eye. More details of opacity filter 114 and light-guide optical element 115 are provided in U.S. Published Patent Application No. 2012/0127284, entitled, "Head-Mounted Display Device Which Provides Surround Video," which application published on May 24, 2012, and which publication is incorporated herein by reference in its entirety.

Control circuits 136 provide various electronics that support the other components of head mounted display device 2. More details of control circuits 136 are provided below with respect to FIG. 7. Inside or mounted to temple 102 are ear phones 130, inertial measurement unit 132 and temperature sensor 138. In one embodiment shown in FIG. 7, the inertial measurement unit 132 (or IMU 132) includes inertial sensors such as a three axis magnetometer 132A, three axis gyro 132B and three axis accelerometer 132C. The inertial measurement unit 132 senses position, orientation, and sudden accelerations (pitch, roll and yaw) of head mounted display device 2. The IMU 132 may include other inertial sensors in addition to or instead of magnetometer 132A, gyro 132B and accelerometer 132C.

Microdisplay 120 projects an image through lens 122. There are different image generation technologies that can be used to implement microdisplay 120. For example, microdisplay 120 can be implemented in using a transmissive projection technology where the light source is modulated by optically active material, backlit with white light. These technologies are usually implemented using LCD type displays with powerful backlights and high optical energy densities. Microdisplay 120 can also be implemented using a reflective technology for which external light is reflected and modulated by an optically active material. The illumination is forward lit by either a white source or RGB source, depending on the technology. Digital light processing (DLP), liquid crystal on silicon (LCOS) and Mirasol® display technology from Qualcomm, Inc. are all examples of reflective technologies which are efficient as most energy is reflected away from the modulated structure and may be used in the present system. Additionally, microdisplay 120 can be implemented using an emissive technology where light is generated by the display. For example, a PicoP™ display engine from Microvision, Inc. emits a laser signal with a micro mirror steering either onto a tiny screen that acts as a transmissive element or beamed directly into the eye (e.g., laser).

Light-guide optical element 115 transmits light from microdisplay 120 to the eye 140 of the user wearing head mounted display device 2. Light-guide optical element 115 also allows light from in front of the head mounted display device 2 to be transmitted through light-guide optical element 115 to eye 140, as depicted by arrow 142, thereby allowing the user to have an actual direct view of the space in front of head mounted display device 2 in addition to receiving a virtual image from microdisplay 120. Thus, the walls of light-guide optical element 115 are see-through. Light-guide optical element 115 includes a first reflecting surface 124 (e.g., a mirror or other surface). Light from microdisplay 120 passes through lens 122 and becomes incident on reflecting surface 124. The reflecting surface 124 reflects the incident light from the microdisplay 120 such that light is trapped inside a planar substrate comprising light-guide optical element 115 by internal reflection. After several reflections off the surfaces of the substrate, the trapped light waves reach an array of selectively reflecting surfaces 126. Note that one of the five surfaces is labeled 126 to prevent over-crowding of the drawing. Reflecting surfaces 126 couple the light waves incident upon those reflecting surfaces out of the substrate into the eye 140 of the user. More details of a light-guide optical element can be found in United States Patent Publication No. 2008/0285140, entitled "Substrate-Guided Optical Devices," published on Nov. 20, 2008, incorporated herein by reference in its entirety.

Head mounted display device 2 also includes a system for tracking the position of the user's eyes. As will be explained below, the system will track the user's position and orientation so that the system can determine the FOV of the user. However, a human will not perceive everything in front of them. Instead, a user's eyes will be directed at a subset of the environment. Therefore, in one embodiment, the system will include technology for tracking the position of the user's eyes in order to refine the measurement of the FOV of the user. For example, head mounted display device 2 includes eye tracking assembly 134 (FIG. 6), which has an eye tracking illumination device 134A and eye tracking camera 134B (FIG. 6). In one embodiment, eye tracking illumination device 134A includes one or more infrared (IR) emitters, which emit IR light toward the eye. Eye tracking camera 134B includes one or more cameras that sense the reflected IR light. The position of the pupil can be identified by known imaging techniques which detect the reflection of the cornea. For example, see U.S. Pat. No. 7,401,920, entitled "Head Mounted Eye Tracking and Display System", issued Jul. 22, 2008, incorporated herein by reference. Such a technique can locate a position of the center of the eye relative to the tracking camera. Generally, eye tracking involves obtaining an image of the eye and using computer vision techniques to determine the location of the pupil within the eye socket. In one embodiment, it is sufficient to track the location of one eye since the eyes usually move in unison. However, it is possible to track each eye separately.

In one embodiment, the system will use four IR LEDs and four IR photo detectors in rectangular arrangement so that there is one IR LED and IR photo detector at each corner of the lens of head mounted display device 2. Light from the LEDs reflect off the eyes. The amount of infrared light detected at each of the four IR photo detectors determines the pupil direction. That is, the amount of white versus black in the eye will determine the amount of light reflected off the eye for that particular photo detector. Thus, the photo detector will have a measure of the amount of white or black in the eye. From the four samples, the system can determine the direction of the eye.

Another alternative is to use four infrared LEDs as discussed above, but one infrared CCD on the side of the lens of head mounted display device 2. The CCD will use a small mirror and/or lens (fish eye) such that the CCD can image up to 75% of the visible eye from the glasses frame. The CCD will then sense an image and use computer vision to find the image, much like as discussed above. Thus, although FIG. 6 shows one assembly with one IR transmitter, the structure of FIG. 6 can be adjusted to have four IR transmitters and/or four IR sensors. More or less than four IR transmitters and/or four IR sensors can also be used.

Another embodiment for tracking the direction of the eyes is based on charge tracking. This concept is based on the observation that a retina carries a measurable positive charge and the cornea has a negative charge. Sensors are mounted by the user's ears (near earphones 130) to detect the electrical potential while the eyes move around and effectively read out what the eyes are doing in real time. Other embodiments for tracking eyes can also be used.

FIG. 6 shows half of the head mounted display device 2. A full head mounted display device would include another set of see-through lenses, another opacity filter, another light-guide optical element, another microdisplay 120, another lens 122, room-facing camera, eye tracking assembly, micro display, earphones, and temperature sensor.

Figure 7:
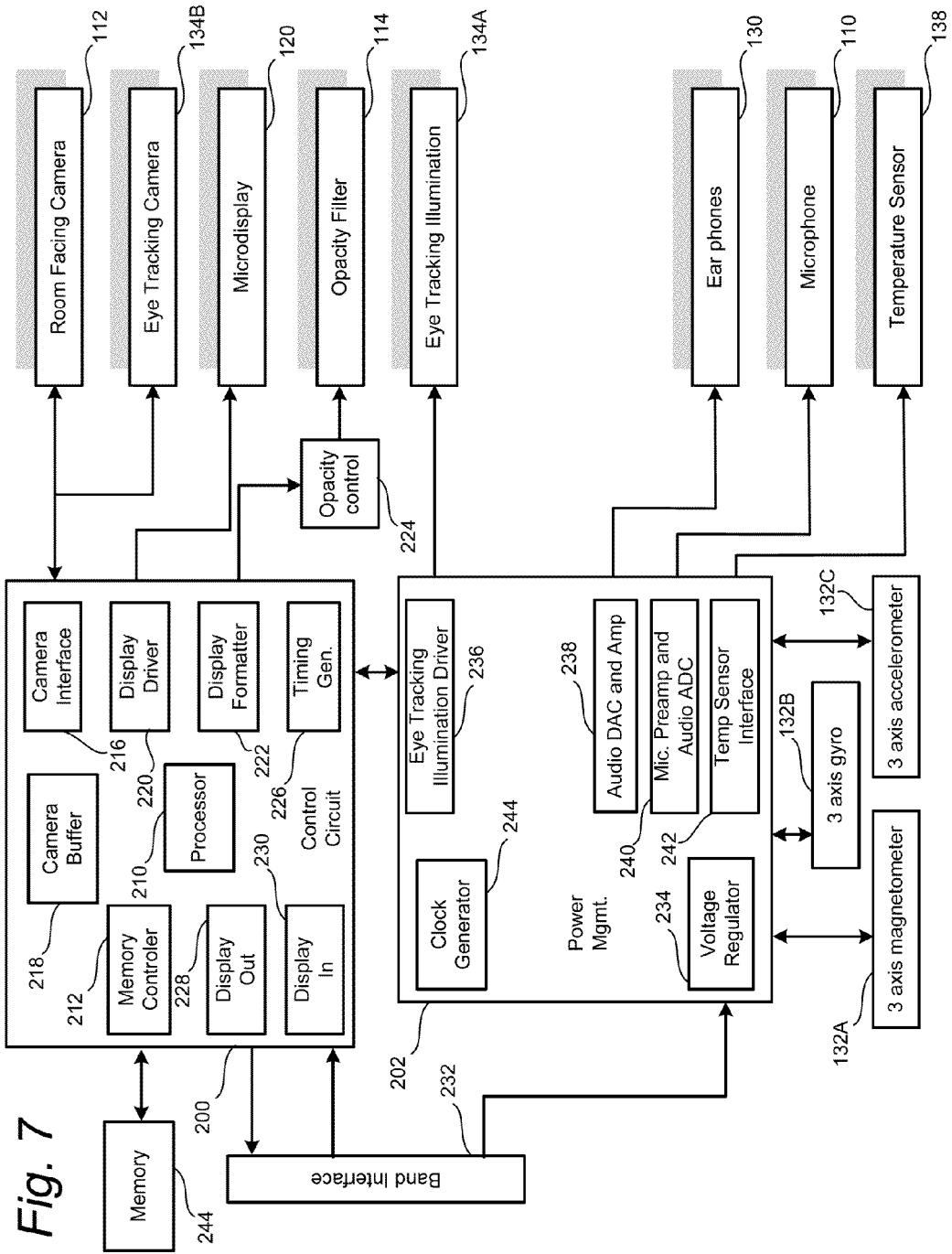
FIG. 7 is a block diagram of one embodiment of the components of a head mounted display unit.
Figure 8:
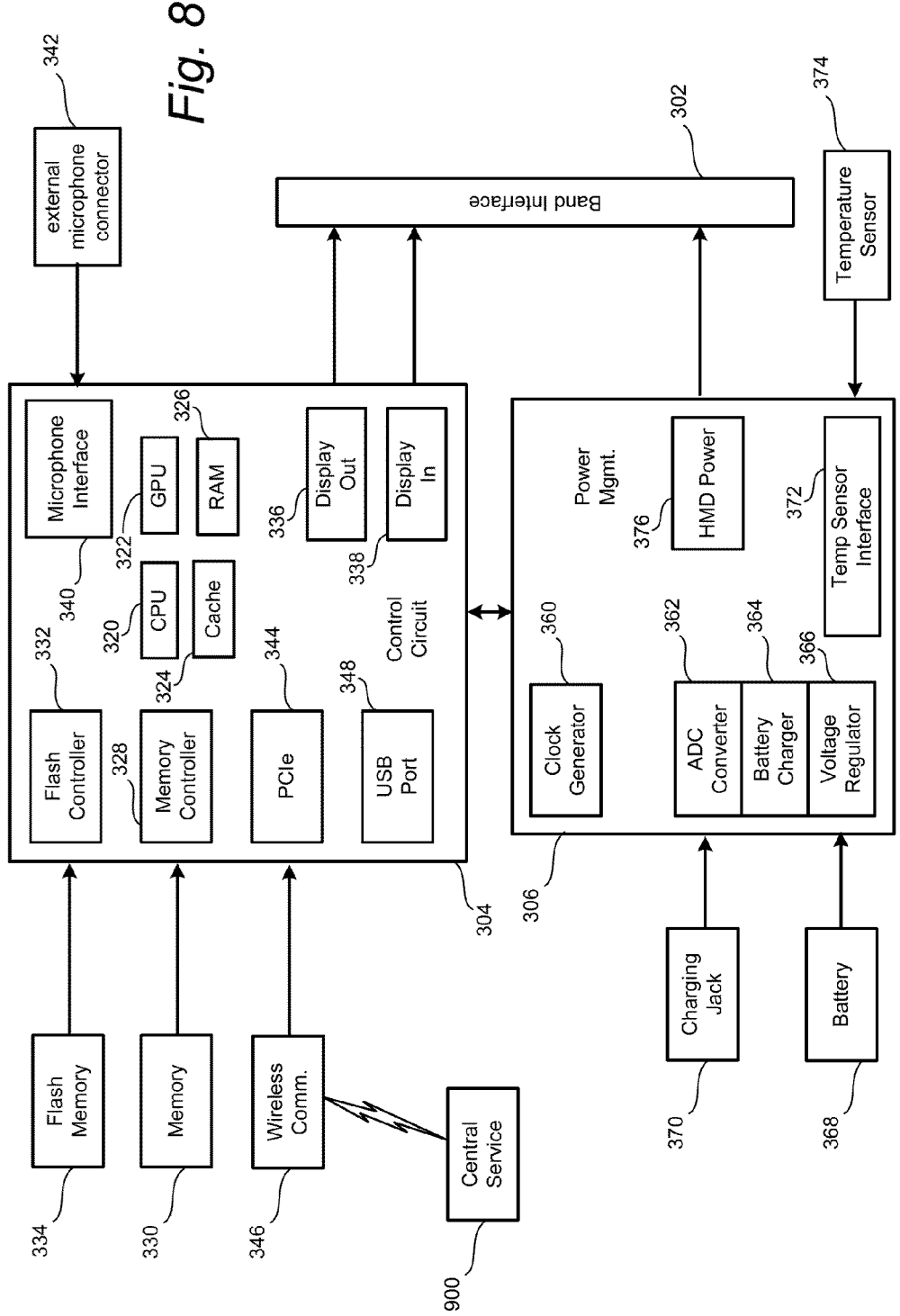
FIG. 8 is a block diagram of one embodiment of components of a processing unit associated with a head mounted display unit.

FIG. 7 is a block diagram depicting the various components of head mounted display device 2. FIG. 8 is a block diagram describing the various components of processing unit 4. Head mounted display device 2, the components of which are depicted in FIG. 7, is used to provide a mixed reality experience to the user by fusing one or more virtual images seamlessly with the user's view of the real world. Additionally, the head mounted display device components of FIG. 7 include many sensors that track various conditions. Head mounted display device 2 will receive instructions about the virtual image from processing unit 4 and will provide the sensor information back to processing unit 4. Processing unit 4, the components of which are depicted in FIG. 7, will receive the sensory information from head mounted display device 2 a central service 900. Based on that exchange of information and data, processing unit 4 will determine where and when to provide a virtual image to the user and send instructions accordingly to the head mounted display device.

Some of the components of FIG. 7 (e.g., room-facing camera 112, eye tracking camera 134B, microdisplay 120, opacity filter 114, eye tracking illumination 134A, earphones 130, and temperature sensor 138) are shown in shadow to indicate that there are two of each of those devices, one for the left side and one for the right side of head mounted display device 2. FIG. 7 shows the control circuit 200 in communication with the power management circuit 202. Control circuit 200 includes processor 210, memory controller 212 in communication with memory 214 (e.g., D-RAM), camera interface 216, camera buffer 218, display driver 220, display formatter 222, timing generator 226, display out interface 228, and display in interface 230.

In one embodiment, all of the components of control circuit 200 are in communication with each other via dedicated lines or one or more buses. In another embodiment, each of the components of control circuit 200 is in communication with processor 210. Camera interface 216 provides an interface to the two room-facing cameras 112 and stores images received from the room-facing cameras in camera buffer 218. Display driver 220 will drive microdisplay 120. Display formatter 222 provides information, about the virtual image being displayed on microdisplay 120, to opacity control circuit 224, which controls opacity filter 114. Timing generator 226 is used to provide timing data for the system. Display out interface 228 is a buffer for providing images from room-facing cameras 112 to the processing unit 4. Display in interface 230 is a buffer for receiving images such as a virtual image to be displayed on microdisplay 120. Display out interface 228 and display in interface 230 communicate with band interface 232 which is an interface to processing unit 4.

Power management circuit 202 includes voltage regulator 234, eye tracking illumination driver 236, audio DAC and amplifier 238, microphone preamplifier and audio ADC 240, temperature sensor interface 242 and clock generator 244. Voltage regulator 234 receives power from processing unit 4 via band interface 232 and provides that power to the other components of head mounted display device 2. Eye tracking illumination driver 236 provides the IR light source for eye tracking illumination 134A, as described above. Audio DAC and amplifier 238 output audio information to the earphones 130. Microphone preamplifier and audio ADC 240 provides an interface for microphone 110. Temperature sensor interface 242 is an interface for temperature sensor 138. Power management circuit 202 also provides power and receives data back from three axis magnetometer 132A, three axis gyro 132B and three axis accelerometer 132C.

FIG. 8 is a block diagram describing the various components of processing unit 4. FIG. 8 shows control circuit 304 in communication with power management circuit 306. Control circuit 304 includes a central processing unit (CPU) 320, graphics processing unit (GPU) 322, cache 324, RAM 326, memory controller 328 in communication with memory 330 (e.g., D-RAM), flash memory controller 332 in communication with flash memory 334 (or other type of non-volatile storage), display out buffer 336 in communication with head mounted display device 2 via band interface 302 and band interface 232, display in buffer 338 in communication with head mounted display device 2 via band interface 302 and band interface 232, microphone interface 340 in communication with an external microphone connector 342 for connecting to a microphone, PCI express interface for connecting to a wireless communication device 346, and USB port(s) 348. In one embodiment, wireless communication device 346 can include a Wi-Fi enabled communication device, Blue-Tooth communication device, infrared communication device, etc. The USB port can be used to dock the processing unit 4 a computing in order to load data or software onto processing unit 4, as well as charge processing unit 4. In one embodiment, CPU 320 and GPU 322 are the determine where, when and how to insert virtual three-dimensional objects into the view of the user. More details are provided below.

Power management circuit 306 includes clock generator 360, analog to digital converter 362, battery charger 364, voltage regulator 366, head mounted display power source 376, and temperature sensor interface 372 in communication with temperature sensor 374 (possibly located on the wrist band of processing unit 4). Analog to digital converter 362 is used to monitor the battery voltage, the temperature sensor and control the battery charging function. Voltage regulator 366 is in communication with battery 368 for supplying power to the system. Battery charger 364 is used to charge battery 368 (via voltage regulator 366) upon receiving power from charging jack 370. HMD power source 376 provides power to the head mounted display device 2.

Figure 9:
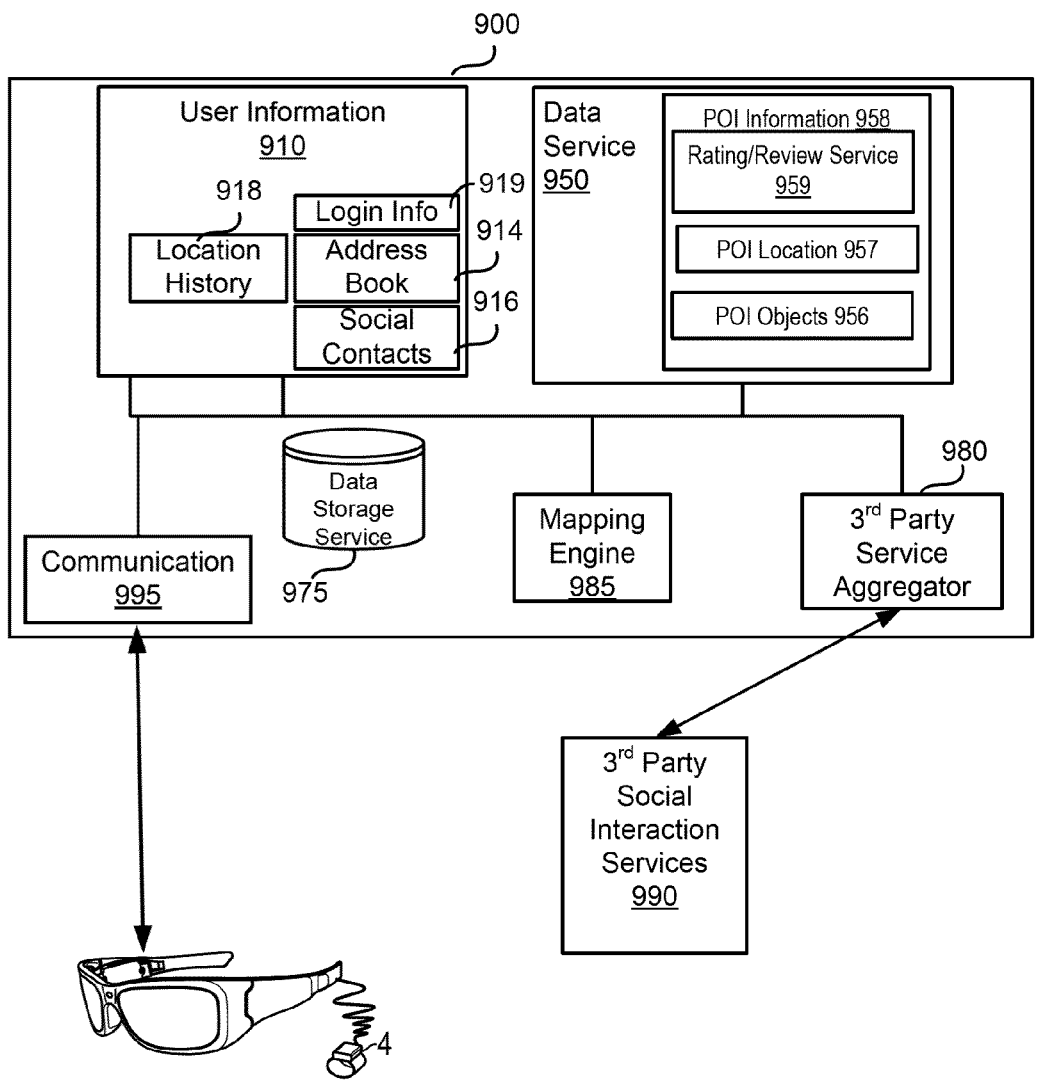
FIG. 9 is a block diagram of one embodiment of the components of a service provider used in accordance with the present technology.

As noted above, see-through head mounted display device 2 may be utilized with a central service 900. In one aspect the central service is illustrated in FIG. 9. Central service 900 may be operated on one or more processing devices or servers. The logical components of the central service 900 are illustrated in FIG. 9.

Central service 900 may include user information 910, a data service 950, a third-party service aggregator 980, a mapping engine 985, data storage services 975, and communications interface 995 which communicates with the see-through mounted display device 2. User information 910 can include login information 919 requiring any wearer of a device 2 to authenticate their identity before accessing secure information available to users of the see-through head mounted display device 2. Each user may have available via the service 900 user's address book 914 and social contact data 916, as well as the user's location history 918. In alternative embodiments, all or portions of the user information may be stored locally on the device 2. Data service 950 may include point of interest information 958 which can include a rating/review service 959, of interest location information 957, and point of interest virtual objects 955. Third-party service aggregator 980 retrieves information from third-party social media services 990, each of which may provide information that can be used to populate near field virtual objects. Third-party service aggregator 980 interacts with the application programming interface (API) of each of the third-party interaction services 990.

Mapping engine 985 associates geographic coordinate location information with data from the data service 950 and from third-party service aggregator 980. Mapping engine 985 also receives location information from user devices 2 and updates the user location history 918. The mapping engine may also provide 3D scene data to the see-through head mounted display device 2. This information can be updated as the user location tracking information is provided from the device 2 to the central service 900. The mapping engine 985 can further associate the type of marker to be generated with the third-party information services provider.

Third-party social interaction services 990 may include with their information the geographic coordinates for points of interest for which they provide information. Many social media services 990 include, along with their reviews, such geographic coordinate location information. The mapping engine 985 may verify this information, or add geographic coordinate information to user generated data. This location can be derived from the user's location history, as well as input at the time the user is creates information on a particular point of interest.

Point of interest information 958 includes point of interest information provided by users of see-through head mounted displays, as well as information provided by other users of the central service 900 who contribute to the data service 950. POI objects 956 can include default object types rendered depending on the source and/or type of information available for the near field object, as well as specialized objects provided by operators of the point of interest for use in conjunction with the see-through head mounted display device. Each point of interest may have an object associated with it based on the type of point of interest, the service from which the information originated, or may use a default near field virtual object.

Central service 900 may be operated by one or more system administrators provide a central service two wearers of the see-through head mounted display device two.

Figure 10:
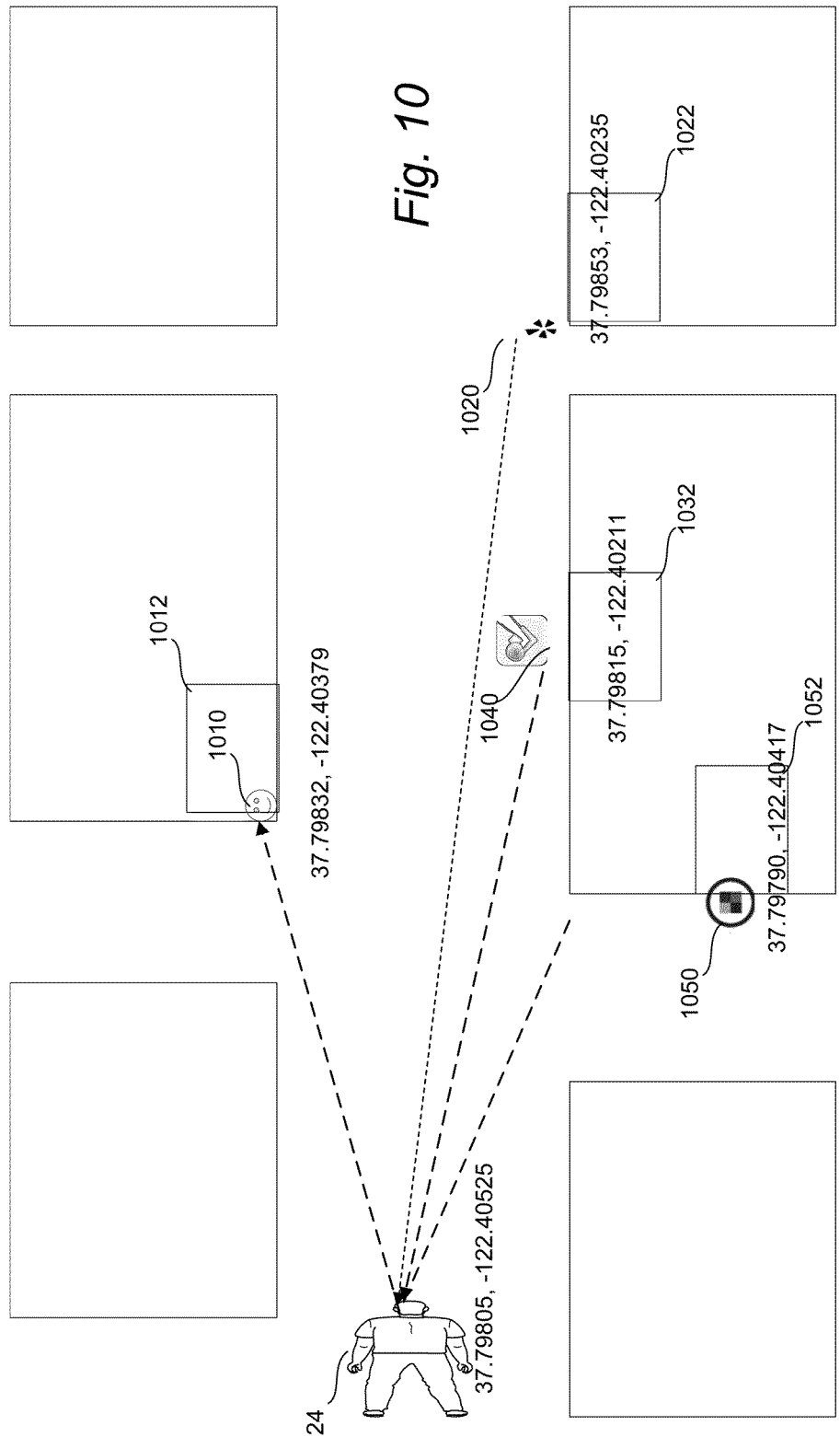
FIG. 10 is a top view of the perspective of a user relative to the scene in FIG. 1.

As noted herein, the appearance of any of the markers 1010, 1020, 1030, 1040, 1050 may in some embodiments be dependent upon the distance of the wearer to the point of interest with which the marker is associated. FIG. 10 is a top-down perspective of the user relative to the view shown in FIG. 2 and illustrates a user 24 viewing the respective markers 1010, 1020, 1040, and 1050 associated with different points of interest. As illustrated in FIG. 10, the user is at a different physical distances to each of the respective points of interest 1012, 1022, 1042, 1052 represented by 1010, 1020, 1040, 1050. Each points of interest 1012, 1022, 1042, 1052 has an associated global coordinates, also illustrated in FIG. 10. Distances shown in FIG. 10 can be used to calculate the size of the marker as it appears in the user's view such as that shown in FIG. 2A. Hence, the relative sizes of the markers are proportional to their distance from the wearer. Alternatively, the system administrator of service 900 can allow markers to be displayed based on incentives provided from the operator of the point of interest, or other design factors, such as the type of point of interest for which the marker is displayed.

Figure 11:
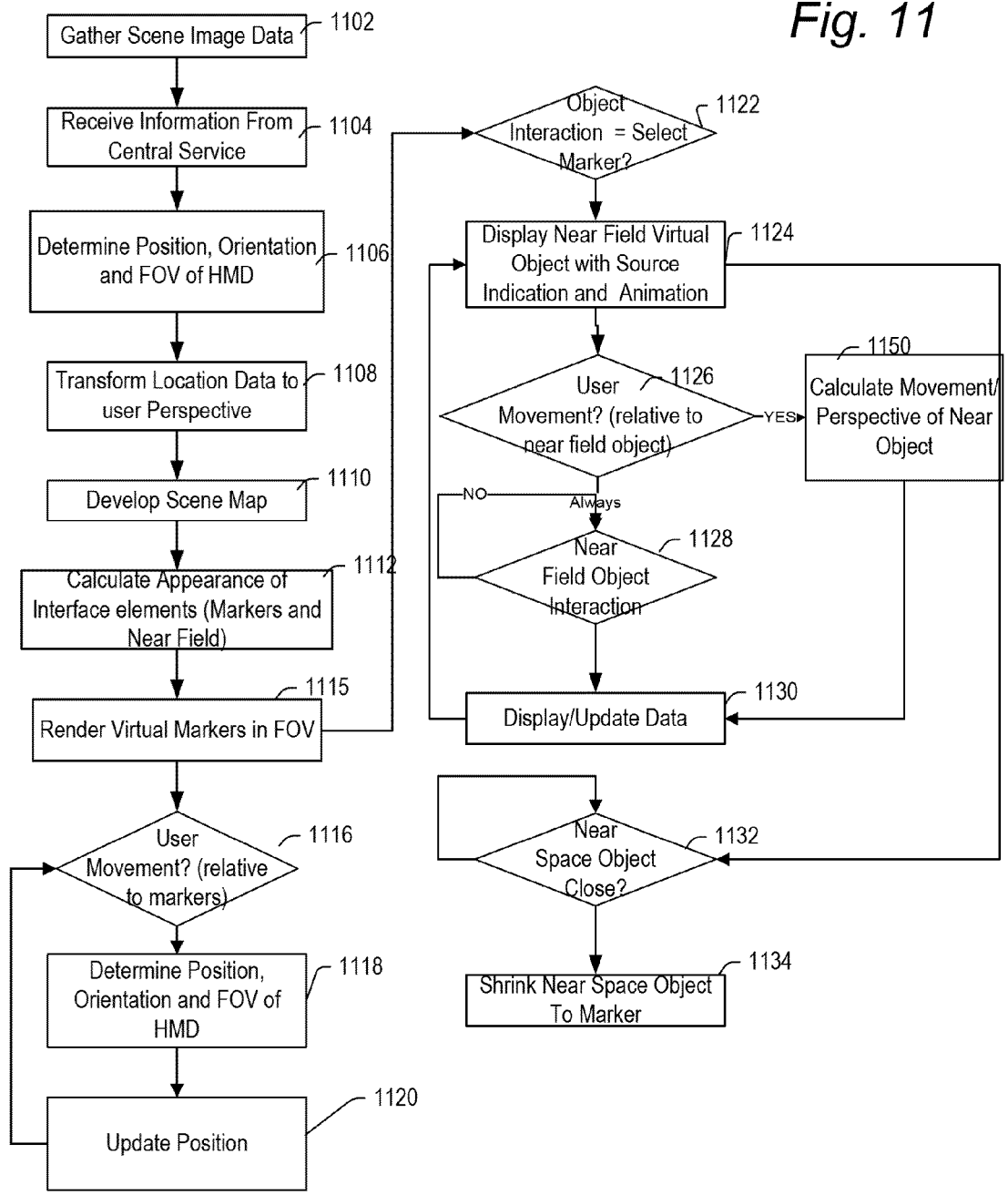
FIG. 11 is a method for performing the present technology.

FIG. 11 is flowchart of the operation and interactivity of the head mounted display device 2 and its processing unit 4 during a discrete time period such as the time it takes to generate, render and display a single frame of image data to a user. In embodiments, the displayed image may be refreshed at a rate of 60 Hz, though it may be refreshed more often or less often in further embodiments.

FIG. 11 represents one embodiment of the present technology. In general, the system generates a scene map having local or global coordinates of the environment and objects in the environment such as the user, real-world objects and virtual objects. The system also tracks the FOV of the user. For a given frame of image data, a user's view may include one or more real and/or virtual objects. As a user turns his head, for example left to right or up and down, the relative position of real-world objects in the user's FOV inherently moves within the user's FOV. For example, a building in FIG. 2 may appear on the right side of a user's FOV at first. But if the user then turns his head toward the right, the same building may eventually end up on the left side of the user's FOV.

In an example where a user is looking at a virtual object in his FOV, if the user moves his head left to move the FOV left, the display of the virtual object may be shifted to the right by an amount of the user's FOV shift, so that the net effect is that the virtual object remains stationary within the FOV.

In step 1102, the see-through head mounted display device 2 may gather data from the environment. This may be image data sensed by the depth camera 426 and RGB camera 428 of scene facing camera 112. This may be image data sensed the eye tracking assemblies 134, and this may be acceleration/position data sensed by the IMU 132 and IMU 511.

As explained below, the system develops a 3-D scene map of the mixed reality environment. For some environments, this may be accomplished with the depth camera 426 of the scene facing camera 112. For large scale environments, in step 1104, the processing unit 4 may receive a predefined 3-D depth map of real-world objects in the mixed reality environment from central service 900. As described above, as a user moves around, the processing unit 4 may report the user's location to a central service 900. If available, the central service 900 then sends a predefined 3-D depth map of the surrounding area to the processing unit 4.

While shown as taking place after step 1102, the receipt of the predefined 3-D map in step 1104 may take place before, during or after step 1102, or the other steps described below. Moreover, receipt of the predefined 3-D map need not take place every frame. The predefined 3-D map may be downloaded or updated periodically, for example when processing unit 4 is idle. Further, the processing unit 4 may download a number of different predefined 3-D maps for different locations, and store those in memory. In this instance, it may happen that a predefined 3-D map may be retrieved from memory of the processing unit 4 when a user is at a new location, and there is no need to have a wireless connection to the central service at that time.

In addition, the information received at step 1104 can include a marker information and point of interest information can be used by the see-through head mounted display 2 as discussed herein.

In step 1106, the system determines the position, the orientation and the FOV of the head mounted display device 2 for the user 24. Further details of step 1106 are provided in U.S. patent application Ser. No. 13/525,700, entitled, "Virtual Object Generation Within a Virtual Environment," which application is incorporated by reference herein in its entirety In step 1108, the 3-D map transformed to the user's point of view using the user's current position, orientation and FOV. With the knowledge of the scene and the user's position, a scene map may be developed in step 1110 identifying the geometry of the environment as well as the geometry and positions of objects within the environment. In embodiments, the scene map generated in a given frame may include the local or global coordinate positions of real-world objects and virtual objects in the scene. In embodiments, the scene map of the user's mixed reality environment may be developed from a depth map generated by data received from the scene facing camera 112, from the predefined 3-D map received from the central service 900, or a combination of both.

In step 1112, the system may use the scene map of the user position and FOV to determine the position and appearance of virtual objects at the current instance. For example, where a mixed reality environment includes one or more markers, the system can update their projection as they would appear from the user's current position and FOV.

In step 1115, the processing unit 4 renders those virtual objects which appear within the FOV of the head mounted display device 2. In step 1115, the GPU 322 of processing unit 4 may next render an virtual object to be displayed to the user. Portions of the rendering operations may have already been performed in a rendering setup step.

At step 1116, a determination is made as to whether not a user has moved within the environment. If user has not moved, the system continues to check for user movement. If user has moved, then at step 1118, the position, orientation and FOV of the head mounted display is again determined in a manner similar to step 1106. At step 1120, the position of the user, as well as all objects rendered in the user's field of view in the see-through head mounted display 2, are updated and re-rendered.

Returning to step 1115, in addition to checking for user movement relative to the environment and the markers, the system also checks at step 1122 is to whether not the object interaction by the user has been made. Object interaction can include selecting a marker, as discussed above with respect to FIG. 2B. If no selection has been made, the system continues to check for object interaction at 1122. If an object interaction has been made, then a near field virtual object will be displayed at 1124. Display the near field virtual object at 1124 may be any of the previously discussed virtual object types illustrated above with respect to FIG. 2.

Once the near field virtual object has been displayed at 1124, the system again continually checks for user movement relative to both the world coordinate position and the near field virtual object at 1126.

A user movement with the near field object displayed should change the user's view of both the markers (handled at steps 1116-1120) and the near field object. If the user moves relative to the near field virtual object at 1126, then a calculation of the change in the viewer's perspective of the near field object is made at step 1150. This calculation is relative to the reference system of the near field virtual object. One embodiment of this method is discussed below with respect to FIG. 12 depending on whether or not the near field virtual object is will user-locked or world locked. In addition to checking to user movement at 1126, a determination will be made at step 1128 as to whether or not near field virtual object interaction occurs. If near field object interaction if near field object interaction does occur at step 1128, then the users in view of the object as well as any data contributed by the user in interacting with the object will be updated at 1130.

Near field object interaction can include closing the object, using virtual controls to review information on the object, or adding/deleting information from the object (and hence the information source). As such interaction occurs, the changes to the information are updated in the display of the near field object.

At 1132, the method checks to determine whether or not the user is attempting to close the near field virtual object. If so, the object will be closed using, for example, an animation which renders the object shrinking relative to the marker, in an inverse manner to that in which the object appeared.

Figure 12:
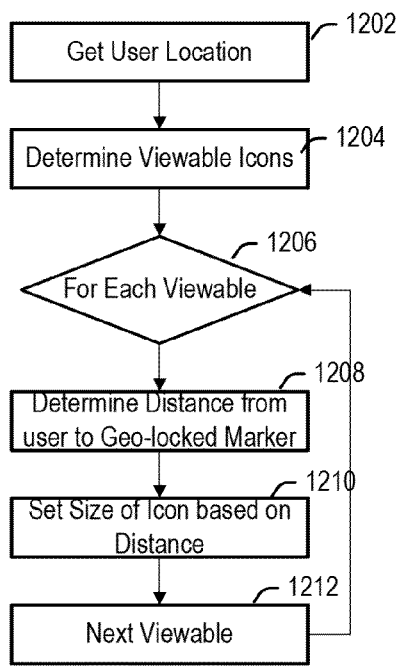
FIG. 12 is a method for performing a step 1250 in FIG. 11.

FIG. 12 illustrates one method for performing step 1150 in FIG. 11. The method updates the perspective of the markers in the wearer FOV. At step 1202, the user's location and orientation in field of view are determined. At step 1204, the viewable markers within the user's field of view are determined. At 1206, for each viewable marker, at 1208 a distance is determined from the user to the marker using the relative geographic coordinates of the marker and the user 24. The size of the marker has been set at 1210 based on the distance. At 1212 the method returned to the next viewable marker. The new marker objects with adjusted sizes and perspective are rendered at step 1130 in FIG. 11.

Figure 13:
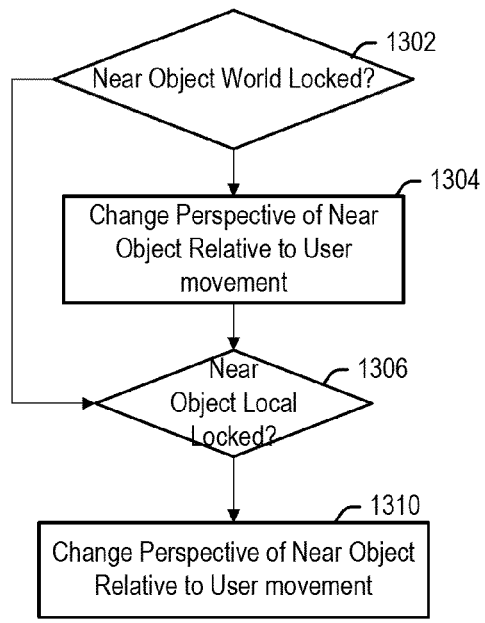
FIG. 13 is a method for performing a step in FIG. 11.

FIG. 13 illustrates one method for calculating the perspective and view of a near field object based on whether or not the near field virtual object is world locked or locally locked. In one embodiment, FIG. 13 implements step 1150 in FIG. 11. An initial determination is made at 1302 as to whether or not the near world object is locally locked or world-locked. Whether a near world object is locally or world-locked can be defined in an object definition, or system-wide. For example, some owners of points of interest may choose to ensure that a near-field object does not move with the user after being displayed based on aesthetic or design considerations. If the object is determined to be world-locked at 1302, then at 1304 a calculation as to the user's perspective from each new position is made as a user moves relative to the user's initial position where the near-field object was rendered. Relative to the point of interest, the user's perspective of the near-field object will change with each movement. Since the object is world locked, the user's perspective will be that the location of the near-field object is locked in space, much like that of an immovable real object. If the object is determined to be user-locked at 1306, then the method updates the perspective, location and size of the tether to be displayed as the user moves relative to the point of interest. If the near-field object is user-locked, the size of the near-field object relative to the user will not change, but the tether will change as the user's position relative to the real world point of interest changes.

Any one or more of the methods herein may be implemented by computer readable code stored on a computer storage medium which may be suitably read by any one or more of the processing unit 4 and/or head mounted display device 2.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. In a see-through head mounted display, a method of displaying information associated with real world environments, comprising:
    determining a position of one or more holographic markers relative to geographic coordinates in an environment, the markers indicating information regarding a point of interest in the environment is available;
    rendering the markers in the display relative to the position and a field of view of a user;
    receiving a selection of a marker from a user;
    rendering a near-field virtual object including a visual relationship to the marker, the near-field virtual object displaying the information associated with the marker, the visual relationship comprising a tether extending between the near field object and the marker, a first end of the visual tether associated with the marker appearing to be at a greater distance from the user than a second end of the tether and the virtual object.

2. The method of claim 1 wherein input controls are adapted to allow input using one of user movements and user utterances.

3. The method of claim 1 further including receiving at least a portion of the information from third party social media services.

4. The method of claim 1 wherein the visual relationship is a visual tether between the near-field object and the marker, a first end of the visual tether associated with the marker appearing to be at a greater distance from the user than a second end of the tether and the virtual object.

5. The method of claim 1 wherein the visual relationship is a representation of a source of the information displayed at the marker and at the near-field virtual object.

6. The method of claim 1 wherein each marker in the field of view of the user has a relative size based on a distance between the user and the point of interest associated with the marker.

7. The method of claim 1 wherein at least one marker in the field of view of the user has a relative size based on a sponsorship by an operator of the point of interest associated with the marker.

8. The method of claim 1 further including monitoring user movement relative to the environment and altering the rendering of the near-field virtual object.

9. The method of claim 8 wherein the rendering includes rendering the near-field object relative to a local coordinate system referenced to the user.

10. The method of claim 9 wherein the rendering includes rendering the near-field object relative to a global coordinate system.

11. A see-through head mounted display device including a display and a processor, the processor coupled to a storage device, comprising:

code instructing the processor to determine geo-located positions of points of interest within a field of view of a user in an environment and calculate positions of associated markers indicating information regarding an associated point of interest is available to the user;

code instructing the processor to render the markers in the display relative to the geo-located position and the field of view of the user to the geo-located position, each marker presenting a representation of a source of the information associated with the marker;

code instructing the processor to detect a selection of a marker from a user by a user gesture in the field of view which intersects a perceived position of the marker to the user;

code instructing the processor to display a near-field virtual object having a visual tether to the marker simultaneously with the marker in the field of view, the near-field virtual object displaying the information associated with the marker, the visual tether extending between the near field object and the marker, the tether displayed with a virtual length, extending into a depth of the field of view, the virtual length decreasing as a distance between the near field object and the point of interest gets smaller.

12. The display device of claim 11 wherein the representation is rendered a source-specific icon indicating of the source of the information displayed at the marker and at the near-field virtual object.

13. The display device of claim 12 further including code instructing the processor to monitor user movement relative to the environment and altering the rendering of the markers in the field of view and the near-field virtual object.

14. The display device of claim 13 wherein code instructs the processor to render the near-field object relative to a local coordinate system referenced to the user.

15. The display device of claim 13 wherein code instructs the processor to render the near-field object relative to a global coordinate system.

16. A see-through head mounted display device, comprising:
a display positionable proximate to a wearers eyes; and
a processor, the processor programmed to
determine positions of virtual object markers within a field of view of the display, the markers indicating information regarding a point of interest associated with a point of interest is accessible;
render the markers in the display, the markers representative of a geo-located position of the point of interest and a perspective of a user to the geo-located position, each marker presenting icon representing a source of the information, each marker having a variable size based on a distance from the device to the geo-located position associated with the point of interest;
detect a selection of a marker from a user by a user gesture in the field of view;
responsive to the selection, render a virtual object occupying a majority of the field of view of the display, the virtual object having a visual tether to the marker simultaneously displayed with the marker and the virtual object in the field of view, the virtual object displaying the information associated with the marker and to display on the near field virtual marker information modification input controls adapted to allow the user to add, edit and modify the information associated with and describing the real world object via at least one of gestures and speech as detected by the device.

17. The display device of claim 16 wherein the processor is programmed to render the visual tether in the field of view such that a first end of the visual tether associated with the marker appears to be at a greater distance from the user than a second end of the tether and the marker.

18. The display device of claim 16 wherein the processor is programmed to monitor user movement relative to the environment and alter the rendering of the markers the field of view and the virtual object.

19. The display device of claim 18 wherein the processor is programmed to render the tether relative to movement of the user.

20. The display device of claim 18 wherein the processor is programmed to render the tether as having a first end connected to the virtual object and a second end coupled to the marker selected.

* * * * *